US011992453B2

(12) United States Patent
Katagiri et al.

(10) Patent No.: US 11,992,453 B2
(45) Date of Patent: May 28, 2024

(54) TENSILE FORCE GENERATING DEVICE AND BENDING AND STRETCHING MOTION ASSIST DEVICE PROVIDED WITH SAME

(71) Applicant: HONDA MOTOR CO., LTD., Tokyo (JP)

(72) Inventors: Kenichi Katagiri, Saitama (JP); Toru Takenaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 666 days.

(21) Appl. No.: 17/284,178

(22) PCT Filed: Jul. 24, 2019

(86) PCT No.: PCT/JP2019/029102
§ 371 (c)(1),
(2) Date: Apr. 9, 2021

(87) PCT Pub. No.: WO2020/079910
PCT Pub. Date: Apr. 23, 2020

(65) Prior Publication Data

US 2021/0330541 A1 Oct. 28, 2021

(30) Foreign Application Priority Data

Oct. 15, 2018 (JP) ................................ 2018-194348

(51) Int. Cl.
*A61H 3/00* (2006.01)

(52) U.S. Cl.
CPC ....... *A61H 3/00* (2013.01); *A61H 2201/1642* (2013.01); *A61H 2201/165* (2013.01);
(Continued)

(58) Field of Classification Search
CPC ........................................................ A61H 3/00
See application file for complete search history.

(56) References Cited

U.S. PATENT DOCUMENTS 406,328 A * 7/1889 Yagn ..................... A63B 25/10
482/77
4,872,665 A * 10/1989 Chareire .............. A61F 5/0102
601/35
(Continued)

FOREIGN PATENT DOCUMENTS

JP 2015163180 A 9/2015
JP 2016123617 A 7/2016
(Continued)

OTHER PUBLICATIONS

English translation of International Search Report for PCT Application PCT/JP2019/029102 mailed Oct. 8, 2019; 1 page.

*Primary Examiner* — Jacqueline Woznicki
(74) *Attorney, Agent, or Firm* — Armstrong Teasdale LLP

(57) ABSTRACT

A tensile force generating device includes: a base member; a guide pipe having a base end fixed to the base member and a free end, the guide pipe being provided with a first slot extending in a longitudinal direction; a tubular elastic member fitted over the guide pipe and having a base end supported by the base member on a side of the base end of the guide pipe; a flexible wire passed into the guide pipe from a side of the base end of the guide pipe; an end member slidably mounted on the guide pipe and supporting a free end of the elastic member; and a slider slidably received in the guide pipe, joined to a tip of the wire, and joined to the end member through the first slot.

12 Claims, 13 Drawing Sheets

(52) U.S. Cl.
CPC ................ *A61H 2201/1664* (2013.01); *A61H 2201/1676* (2013.01); *A61H 2205/088* (2013.01); *A61H 2205/106* (2013.01)

(56) References Cited

U.S. PATENT DOCUMENTS

| | | | | |
|---|---|---|---|---|
| 6,171,272 | B1 * | 1/2001 | Akita | A61F 5/0127 602/27 |
| 10,188,577 | B2 | 1/2019 | Takenaka et al. | |
| 2002/0094919 | A1 * | 7/2002 | Rennex | A63B 25/00 482/124 |
| 2005/0070834 | A1 * | 3/2005 | Herr | A61F 2/70 602/28 |
| 2014/0330431 | A1 | 11/2014 | Hollander et al. | |
| 2016/0361222 | A1 * | 12/2016 | Publicover | A61F 5/0123 |
| 2017/0231853 | A1 * | 8/2017 | Auger | A61H 3/00 623/40 |
| 2018/0125738 | A1 * | 5/2018 | Witte | A61B 5/1038 |
| 2018/0177670 | A1 * | 6/2018 | Shim | B25J 9/0006 |
| 2018/0280178 | A1 * | 10/2018 | Shimada | B25J 9/1045 |
| 2020/0281799 | A1 * | 9/2020 | Geffard | B25J 9/104 |
| 2021/0161749 | A1 * | 6/2021 | Odashima | A61H 3/00 |
| 2021/0298985 | A1 * | 9/2021 | Asbeck | B25J 9/0006 |

FOREIGN PATENT DOCUMENTS

| | | | |
|---|---|---|---|
| WO | 2010070807 | A1 | 6/2010 |
| WO | 2018105470 | A1 | 6/2018 |

* cited by examiner

TENSILE FORCE GENERATING DEVICE AND BENDING AND STRETCHING MOTION ASSIST DEVICE PROVIDED WITH SAME

CROSS-REFERENCE TO RELATED APPLICATION

This application is a U.S. National Phase Application of PCT/JP2019/029102 filed Jul. 24, 2019, which claims the benefit of Japanese Patent Application No. 2018-194348 filed Oct. 15, 2018. The content of these applications is hereby expressly incorporated by reference in their entirety.

TECHNICAL FIELD

The present disclosure relates to a tensile force generating device and a bending and stretching motion assist device configured to assist bending and stretching motion of the left and right lower limbs of a person with the tensile force generated by the tensile force generating device.

BACKGROUND ART

A variety of motion assist devices are proposed to assist motion of elderly persons or the like. For example, Patent Document 1 proposes a waist burden reduction device for assisting forward bending of the upper body, in which left and right portions of a waist pad part are coupled to respective lower limbs by respective tensile force transmission strings each having an elastic body in an intermediate portion thereof. In this device, when the person wearing the device bends the trunk forward, the elastic body of each tensile force transmission string is stretched and an assist moment to the waist is generated by the resulting tensile force, whereby the burden on the waist is reduced.

Also, the applicant of the present application has proposed an elastic force generating device for generating an elastic force as an assist force for assisting a motion of a joint of a person wearing the device (Patent Document 2). This elastic force generating device includes an elastic structure (elastic member) composed of a multilayer construction formed by alternately stacking a plurality of elastic bodies, each of which incorporates one or more hermetically sealed air chambers, the volumes of which decrease by compression, and a plurality of partition plates having higher stiffness than that of the elastic bodies, so that an elastic force is generated by compression of the elastic bodies. Thereby, the elastic structure can be made lightweight and compact.

In this elastic force generating device, a through hole is formed in the elastic structure to extend in the stacking direction, and a wire for tensile force transmission is inserted in the through hole. Further, a part of the wire extending out from the elastic structure is provided with a tube, which is a guide tube in which the wire is movably inserted. The elastic structure is permitted to curve to a certain extent due to compression of each elastic body. On the other hand, a guide tube is fitted over the elastic structure to prevent abnormal bending of the elastic structure.

PRIOR ART DOCUMENT(S)

Patent Document(s)

[Patent Document 1] JP2015-163180A
[Patent Document 2] JP2016-123617A

SUMMARY OF THE INVENTION

Task to be Accomplished by the Invention

However, in the elastic force generating device described in Patent Document 2, when the guide tube for preventing the bending of the elastic structure is fitted over the elastic structure, it is necessary to secure a large clearance in order to avoid contact with the elastic bodies which bulge outward when compressed, and this leads to an increase in size of the device. Also, if the elastic structure is curved and contacts the inner surface of the guide tube when the elastic structure is compressed, smooth expansion and contraction of the elastic structure may be hindered by the friction, and the relationship between the amount of compression and the elastic force may be broken.

In view of such background, an object of the present invention is to provide a tensile force generating device that can allow the elastic member to smoothly expand and contract while suppressing increase in size of the device and preventing curving of the elastic member. Another object of the present invention is to provide a bending and stretching motion assist device that can generate a tensile force in accordance with the bending angles of the left and right lower limbs of a person as an assist force in the stretching direction and that can be made compact.

Means to Accomplish the Task

To achieve such objects, one embodiment of the present invention provides a tensile force generating device (60), comprising: a base member (for example, a lower leg link 23); a guide pipe (29) having a base end (29*a*) fixed to the base member and a free end (29*b*), the guide pipe being provided with a first slot (29*c*) extending in a longitudinal direction; a tubular elastic member (30) fitted over the guide pipe and having a base end (33) supported by the base member on a side of the base end of the guide pipe; a flexible tensile force transmitting member (41) passed into the guide pipe from a side of the base end of the guide pipe; an end member (44) slidably mounted on the guide pipe and supporting a tip end (34) of the elastic member; and a slider (50, 70) slidably received in the guide pipe, joined to a tip of the tensile force transmitting member, and joined to the end member through the first slot.

According to this configuration, since the elastic member is fitted over the guide pipe, the elastic member is less likely to contact the guide pipe when the elastic member is compressed and bulges outward. Therefore, it is unnecessary to secure a large clearance between the elastic member and the guide pipe, and the device can be made compact. Further, even if the elastic member curves when compressed, the elastic member comes into contact with the outer surface of the guide pipe with a small degree of curvature, and therefore, smooth expansion and contraction of the elastic member is less likely to be hindered by the generated friction. Therefore, an elastic force in accordance with the amount of compression of the elastic member is applied to the tensile force transmitting member.

In the above configuration, preferably, the slider (50) includes: a slider main body (51) having a free end portion (52) to which the end member (44) is joined and a guide portion (53) that extends in the guide pipe (29) from the free end portion toward the base end (29*a*) of the guide pipe along an axial direction and is formed with a second slot (53*a*) extending in the longitudinal direction; and a movable ring member (55) slidably fitted over the guide portion, and a base end-side end portion of the slider main body is formed with an insertion hole (54) extending to the second slot, and the tensile force transmitting member (41) is passed through the insertion hole and is joined to the movable ring member inside the second slot.

According to this configuration, the movable ring member to which the tensile force transmitting member is joined can slide along the guide portion of the slider main body without causing the end member to slide, and this can provide the tensile force generating device with play in which the elastic force does not act on the tensile force transmitting member. In addition, since the tensile force transmitting member is joined to the movable ring member inside the second slot, it is possible to prevent the slider from tilting due to uneven force and getting caught by the inner surface of the guide pipe.

In the above configuration, preferably, the tensile force generating device (60) further comprises an urging member (45, 76) provided in the guide pipe (29) to constantly urge the movable ring member (55) toward the free end (29*b*) of the guide pipe (29).

According to this configuration, since the urging force of the urging member is applied from the movable ring member to the tensile force transmitting member, a slack in the tensile force transmitting member can be eliminated.

In the above configuration, preferably, the urging member is a compression coil spring (45) provided inside the guide pipe (29) and outside the guide portion (53) in a compressed state between the base member and the movable ring member (55).

According to this configuration, the urging member can be provided in an empty space inside the guide pipe without obstructing the sliding of the movable ring member and the sliding of the slider and with a simple configuration.

In the above configuration, preferably, the slider (70) includes: a slider main body (71) having a free end portion (72) to which the end member (44) is joined and a bottomed tubular cylinder (73) that extends in the guide pipe (29) from the free end portion toward the base end (29*a*) of the guide pipe along an axial direction; and a movable member (75) slidably fitted in the cylinder, and a base end-side end portion of the slider main body is formed with an insertion hole (74) extending to an internal space of the cylinder, and the tensile force transmitting member (41) is passed through the insertion hole and is joined to the movable member inside the internal space of the cylinder.

According to this configuration, the movable member to which the tensile force transmitting member is joined can slide along the cylinder of the slider main body without causing the end member to slide, and this can provide the tensile force generating device with play in which the elastic force does not act on the tensile force transmitting member. In addition, since the tensile force transmitting member is joined to the movable member in the internal space of the cylinder, it is possible to prevent the slider from tilting due to uneven force and getting caught by the inner surface of the guide pipe.

In the above configuration, preferably, the tensile force generating device (60) further comprising an urging member (76) provided in the internal space of the cylinder (73) to constantly urge the movable member (75) toward the free end (29*b*) of the guide pipe (29).

According to this configuration, the urging force of the urging member is applied from the movable member to the tensile force transmitting member, whereby a slack in the tensile force transmitting member can be eliminated.

In the above configuration, preferably, the urging member is a compression coil spring (76) disposed in a compressed state between a bottom wall of the cylinder (73) and the movable member (75), and the bottom wall of the cylinder is provided with a stopper (77) configured to contact against the movable member when the compression coil spring is compressed.

According to this configuration, the urging member can be provided in an empty space inside the guide pipe without obstructing the sliding of the movable member and the sliding of the slider and with a simple configuration.

In the above configuration, preferably, the elastic member (30) consists of an elastic structure having a multilayer structure which includes multiple elastic bodies (31) and multiple annular partition plates (32) stacked alternately in an axial direction, the partition plates having higher stiffness than the elastic bodies.

According to this configuration, a lightweight elastic member that is less likely to undergo buckling or curving can be realized.

In the above configuration, preferably, the end member (44) is detachably joined to the slider (50, 70).

According to this configuration, by removing the end member supporting the tip end of the elastic member from the slider, the elastic member can be removed from the guide pipe without releasing the joining of the tensile force transmitting member to the slider. Further, without requiring the work of joining the tensile force transmitting member to the slider, it is possible to fit the elastic member over the guide pipe and to make the end member support the tip end of the elastic member. Therefore, the replacement work of the elastic member is easy.

In the above configuration, preferably, the tensile force generating device (60) further comprises an end cap (46) provided on the free end (29*b*) of the guide pipe (29) to restrict sliding of the slider (50, 70) toward the free end.

According to this configuration, intrusion of foreign matters into the guide pipe via the free end of the guide pipe is prevented, and therefore, it is possible to maintain smooth sliding of the slider. Also, since the movement of the slider is restricted by the end cap, positioning of the slider can be achieved.

In the above configuration, preferably, the tensile force generating device further comprises a magnet (47) provided on at least one of the slider (50, 70) and the end cap (46) to maintain a state in which the slider is in contact with the end cap.

According to this configuration, when the joining of the end member to the slider is released, the slider does not freely move in the guide pipe. Therefore, the work of joining the end member to the slider at such time as when replacing the elastic member becomes easy.

Also, to achieve the above object, a bending and stretching motion assist device (1) according to one embodiment of the present invention comprises: left and right thigh links (22) configured to be respectively disposed along left and right thighs of a user (P); left and right tensile force generating devices (60) each consisting of the tensile force generating device according to claim 1 and having a lower leg link (23) configured to be disposed along corresponding lower leg of the user and swingably coupled to lower ends of the corresponding thigh links as the base member; a torso mount member (2) having an annular shape to be able to be fitted on a torso of the user to support upper ends (25) of the left and right thigh links swingably on respective sides of left and right hip joints of the user; and left and right lower leg mount members (28) respectively attached to lower ends of the left and right lower leg links so as to be able to be fitted on the corresponding lower legs of the user; wherein left and right tensile force generating devices (60) respectively provided on the left and right lower leg links to assist bending and stretching motion of lower limbs of the user and each configured to generate an assist force in a stretching direction to stretch the corresponding lower limb of the user in accordance with a bending angle between the corresponding lower leg link and the corresponding thigh link, and wherein the tensile force transmitting members (41) are provided as a single tensile force transmitting member for commonly to the left and right tensile force generating devices, and left and right tips of the tensile force transmitting member are joined to the sliders (50, 70) of the left and right tensile force generating devices, respectively.

According to this configuration, bending motion of the lower limbs of the user is transmitted to the upper ends of the left and right thigh links, so that the thigh links can be bent relative to the lower leg links. Further, in the bent state of the lower limbs of the user, the tensile force generated by each tensile force generating device in accordance with the swing angle of the thigh link relative to the lower leg link is transmitted to the user as an assist force to push upward, and therefore, the bending and stretching motion of the user can be favorably assisted. Also, since the tensile force generating devices are made compact, the bending and stretching motion assist device also can be made compact.

Effect of the Invention

Thus, according to the present invention, it is possible to provide a tensile force generating device that can allow the elastic member to smoothly expand and contract while suppressing increase in size of the device and preventing curving of of the elastic member, and a bending and stretching motion assist device that can generate a tensile force in accordance with the bending angles of the left and right lower limbs of a person as an assist force in the stretching direction and that can be made compact.

MODES FOR CARRYING OUT THE INVENTION

In the following, embodiments of the present invention will be described in detail with reference to the drawings.

First Embodiment

Figure 1:
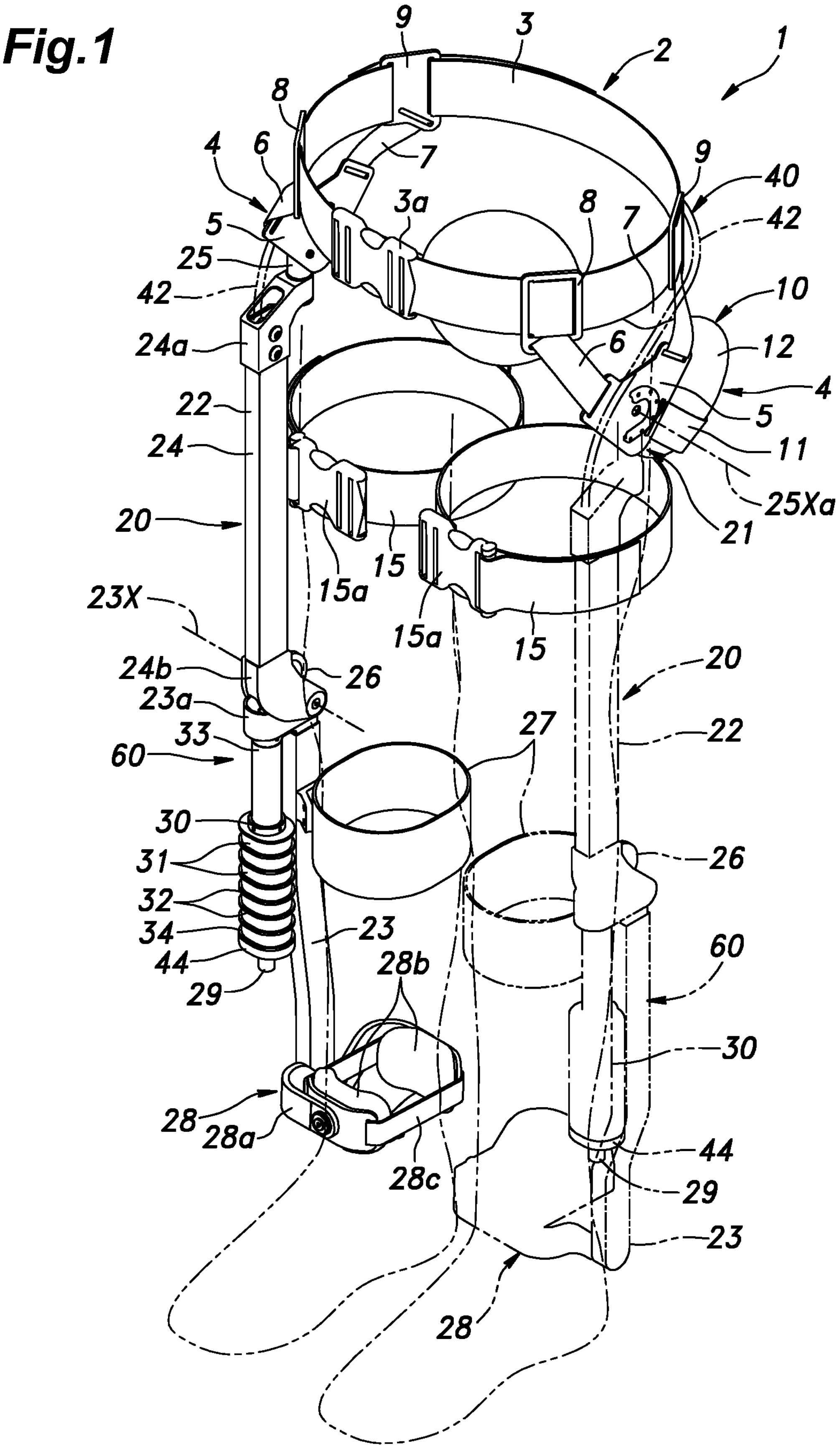
FIG. 1 is a perspective view of a bending and stretching motion assist device according to the first embodiment.
Figure 2:
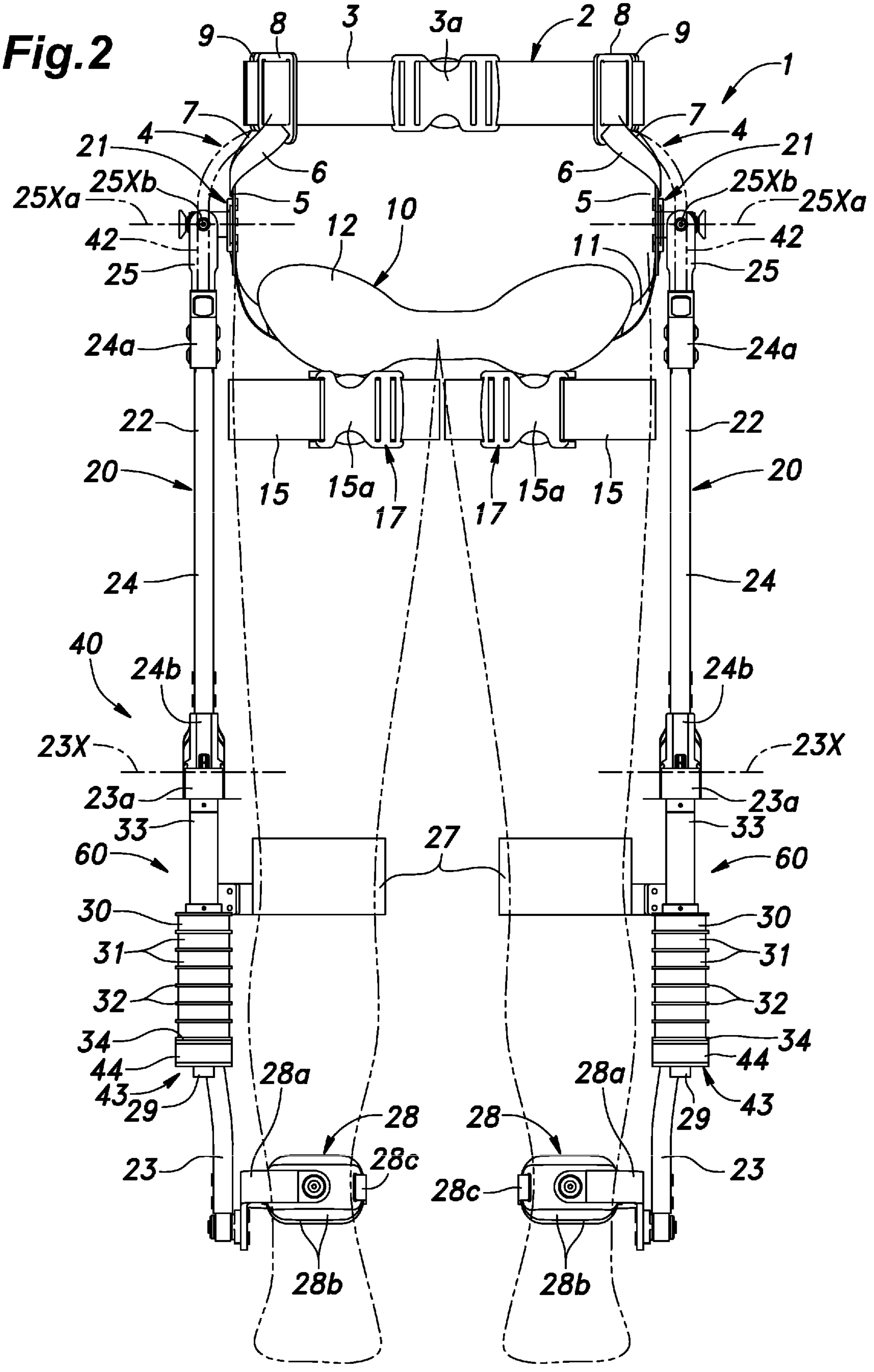
FIG. 2 is a front view of the bending and stretching motion assist device shown in FIG. 1.
Figure 3:
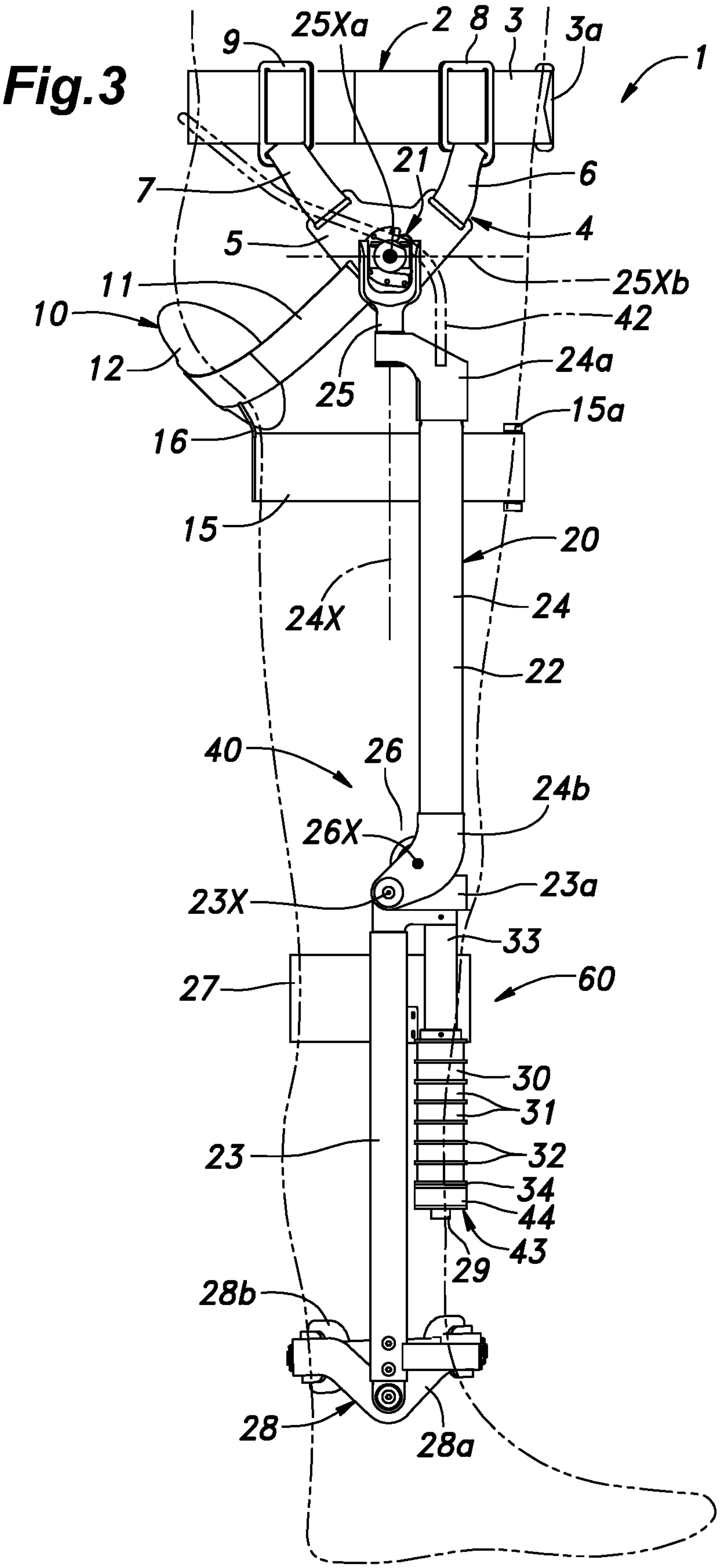
FIG. 3 is a side view of the bending and stretching motion assist device shown in FIG. 1.

First, with reference to FIGS. 1 to 10, the first embodiment of the present invention will be described. A bending and stretching motion assist device 1 shown in FIGS. 1 to 3 is a device to be worn on a lower body of a user P to assist the bending and stretching motion of the left and right lower limbs (legs).

The bending and stretching motion assist device 1 is provided with a torso mount member 2 configured to be worn on the torso of the user P and a buttocks support member 10 configured to be worn on the buttocks of the user P to support the buttocks. Further, the bending and stretching motion assist device 1 includes, as equipment to be worn on the left and right legs of the user P, left and right leg link mechanisms 20 provided to extend from left and right side portions of the torso mount member 2, and left and right elastic members 30 (shown in FIG. 2) that can generate an elastic force for assisting the motion of the respective legs of the user P. Furthermore, the bending and stretching motion assist device 1 includes a motion transmission mechanism 40 configured to transmit bending and stretching motion of the legs (bending and stretching motion of the knee joints) of the user P to the left and right elastic members 30 so that the elastic members 30 can generate the elastic force in response to bending of the leg(s) (one leg or the both legs) of the user P.

In the present embodiment, the torso mount member 2 is configured to be worn on a part of the torso of the user P, for example, a waist (a part corresponding to the height of the lumbar vertebrae, such as a pelvis upper portion or the small of the back). The torso mount member 2 includes an annular torso belt 3 equipped with a buckle 3*a* to be disposed in front of the abdomen of the user P, and is configured to be worn on the waist with the torso belt 3 wrapped around the waist of the user P.

Further, the torso mount member 2 includes left and right link support members 4 provided on the torso belt 3 so as to be suspended from left and right side portions of the torso belt 3 to swingably support the upper ends of the left and right leg link mechanisms 20 on the lateral sides of the left and right hip joints of the user P, respectively. Each link support member 4 is provided with a support plate 5 having high stiffness and swingably supporting the upper end of the leg link mechanism 20 on the corresponding side. A front portion of the support plate 5 is provided with a front suspension belt 6 which extends obliquely forward and upward and is joined to the torso belt 3, while a rear portion of the support plate 5 is provided with a rear suspension belt 7 which extends obliquely rearward and upward and is joined to the torso belt 3.

Each support plate 5 is coupled to the torso belt 3 via the front suspension belt 6 and the rear suspension belt 7 such that in a state where the torso belt 3 is worn on the waist of the user P, the support plates 5 respectively oppose the left and right sides of the waist at a height substantially the same as that of the left and right hip joints of the user P. The front suspension belt 6 extends obliquely forward and upward from the front upper portion of the support plate 5 and is coupled to the front portion of the torso belt 3 via a front mounting bracket 8. The rear suspension belt 7 extends obliquely rearward and upward from the rear upper portion of the support plate 5 and is coupled to the rear portion of the torso belt 3 via a rear mounting bracket 9. The front suspension belt 6 and the rear suspension belt 7 couple the torso belt 3 and the support plate 5 to each other in a length adjustable manner, whereby irrespective of the mounting position of the torso belt 3 on the torso, the position of the support plate 5 can be adjusted.

Note that the torso mount member 2 may be configured to be worn on the torso at a position higher than the waist of the user P. The structure for mounting the torso mount member 2 on the torso of the user P may differ from the aforementioned structure so long as it can maintain the position of the torso mount member 2 relative to the torso substantially constant.

The buttocks support member 10 includes a buttocks belt 11 provided integrally with the torso mount member 2 so as to extend between the left and right support plates 5, and a buttocks pad 12 mounted on the buttocks belt 11 to be disposed along the buttocks of the user P. The buttocks belt 11 have both ends joined to rear portions of the left and right support plates 5, respectively, and in side view (FIG. 3), extends out obliquely rearward and downward from the left and right support plates 5 to extend laterally behind the lower portion of the buttocks of the user P. The both end portions of the buttocks belt 11 are respectively coupled to the support plates 5 on the extension lines of the front suspension belts 6 in side view. The buttocks pad 12 includes a skin member formed with holes through which the buttocks belt 11 is passed and a cushion member provided in the skin member, and has a bilaterally symmetric gourd-like shape elongated in the lateral direction.

Left and right thigh belts 15 configured to be worn on the left and right thighs of the user P are coupled to the buttocks support member 10 via left and right coupling belts 16, respectively. Each thigh belt 15 has a buckle 15*a* to be positioned in front of the thigh, and the buckle 15*a* is provided with a length adjustment mechanism 17. The thigh belt 15 is worn on the thigh of the user P, with the strip-shaped belt member wound around the thigh and the both ends thereof coupled by the buckle 15*a* to form a ring. Each coupling belt 16 is joined to the thigh belt 15 and supports the lower portion of the buttocks pad 12.

The left and right leg link mechanisms 20 are bilaterally symmetric to each other and have an identical structure. Each leg link mechanism 20 is detachably coupled to the support plate 5 of the torso mount member 2 on the corresponding side via an attachment and detachment mechanism 21 and includes one of left and right thigh links 22 configured to be disposed along the thigh of the user P on the corresponding side. The lower end of each of the left and right thigh links 22 is coupled to a lower leg link 23 to be disposed along the lower leg of the user P on the corresponding side. In this way, the left and right thigh links 22 are detachably coupled to the torso mount member 2 via the attachment and detachment mechanisms 21, and therefore, the left and right leg link mechanisms 20 can be removed from and attached to the torso mount member 2, with the torso mount member 2 worn on the torso of the user P.

Each thigh link 22 is configured to extend in the longitudinal direction of the thigh of the user P on a lateral side of the front portion of the thigh, and is provided with a link main body 24 having an upper end portion 24*a* and a lower end portion 24*b* each extending rearward. An upper coupling member 25, which is fixed to the support plate 5, is coupled to the rear portion of the upper end portion 24*a* of the link main body 24 so as to be rotatable about a swing axis 24X parallel to the longitudinal direction of the link main body 24. The upper coupling member 25 is coupled to the support plate 5 to be swingable about a swing axis 25Xa extending in the lateral direction and about a swing axis 25Xb extending in the fore and aft direction.

Each lower leg link 23 is configured to extend in the longitudinal direction of the lower leg of the user P on a lateral side of the lower leg, and is provided with an upper end portion 23*a* which extends forward. The rear portion of the upper end portion 23*a* of the lower leg link 23 is coupled to the rear portion of the lower end portion 24*b* of the thigh link 22 (link main body 24) so as to be swingable about a swing axis 23X extending in the lateral direction. The swing axis 23X of the lower leg link 23 is disposed on the side of the knee joint of the user P. The thigh link 22 may be configured to have a mechanism for enabling adjustment of the length such that the upper coupling member 25 of the thigh link 22 is disposed on the side of the hip joint of the user P and the swing axis 23X of the lower leg link 23 is disposed on the side of the knee joint of the user P.

The rear portion of the upper end portion 23*a* of each lower leg link 23 is provided with a pulley 26 to be rotatable about a rotation axis 26X extending in the lateral direction. The rotation axis 26X of the pulley 26 is positioned above and forward of the swing axis 23X of the lower leg link 23.

An annular lower leg belt 27 is attached to the upper portion of each lower leg link 23 so as to be worn on the upper portion of the lower leg of the user P on the corresponding side as a knee mount member. The lower leg belt 27 is provided with a length adjustment mechanism such as a hook-and-loop fastener, a buckle, and so on (not shown in the drawings), and is wound around the lower leg of the user P thereby to be worn on the lower leg and hold the lower leg link 23 in the vicinity of the lower leg of the user P. Note that the lower leg belt 27 is only required to be worn near the knee joint of the lower limb and does not necessarily have to be attached to the lower leg link 23, and therefore, may be provided between the lower portion of the thigh link 22 and the upper portion of the lower leg link 23.

The above-described thigh belt 15 is worn on the thigh of the user P at a height corresponding to the thigh link 22, but is coupled to the buttocks support member 10 only by the coupling belt 16 and is not coupled to the thigh link 22 (provided in a non-coupled manner with the thigh link 22).

The lower portion of each lower leg link 23 is provided with a lower leg mount member 28 to be worn on the lower portion (ankle) of the lower leg of the user P on the corresponding side. The lower leg mount member 28 includes a support arm 28*a* extending from the lateral side of the ankle of the user P to the front side and rear side of the ankle to have a U-shape in plan view. The rear side of the front portion of the support arm 28*a* and the front side of the rear portion of the support arm 28*a* are respectively provided with front and rear ankle pads 28*b* configured to contact the front and rear sides of the ankle, respectively. Inner parts of the front and rear ankle pads 28*b* are coupled to each other by a fixing belt 28*c* to surround the ankle jointly with the support arm 28*a* and the ankle pads 28*b* thereby to fix the lower leg mount member 28 to the ankle.

Each leg link mechanism 20 is configured as described above. Therefore, with the torso belt 3 of the torso mount member 2 worn on the torso (waist) of the user P and the lower leg belt 27 and the lower leg mount member 28 of each leg link mechanism 20 worn on the lower leg of the user P, each leg link mechanism 20 is worn on the leg of the user P so as to move with the leg.

Specifically, in response to the swing of the thigh of each leg of the user P relative to the torso (swing in the pitch direction at the hip joint), the thigh link 22 of the leg link mechanism 20 on the same side as the leg swings relative to the torso mount member 2 about the swing axis 25Xa extending in the lateral direction. Thereby, the thigh link 22 moves with the thigh of the user P such that the positional relationship with the thigh is maintained substantially constant.

Also, in response to the swing of the lower leg of each leg of the user P relative to the thigh (swing in the pitch direction at the knee joint), the lower leg link 23 of the leg link mechanism 20 on the same side as the leg swings relative to the thigh link 22 about the swing axis 23X extending in the lateral direction. Thereby, the lower leg link 23 moves with the lower leg of the user P such that the positional relationship with the lower leg is maintained substantially constant.

At this time, the annular left and right lower leg belts 27 worn on the upper portions of the left and right lower legs of the user P hold the lower leg links 23 on the corresponding sides, and therefore, each leg link mechanism 20 constituted of the lower leg link 23 and the thigh link 22 is prevented from parting from the lower limb when the knee joint is bent.

The left and right elastic members 30 have the same specifications, and are each disposed to extend along the longitudinal direction of the lower leg link 23 of the corresponding leg link mechanisms 20 in front of the lower leg link 23, with the upper end thereof being fixed to the front portion of the upper end portion 23*a* of the lower leg link 23. In the standing state in which the user P stretches the knee joints, each elastic member 30 is disposed on the axis of the link main body 24 of the thigh link 22. Each elastic member 30 generates an elastic force by undergoing compressive deformation, and the generated elastic force acts on the user P via the motion transmission mechanism 40 as an assist force. The elastic member 30 has a substantially cylindrical shape, and a through hole 30*a* (see FIG. 6), through which a wire 41 is inserted, is formed on the axial center of the elastic member 30.

The motion transmission mechanism 40 includes a wire 41 disposed to extend transversely behind the waist of the user P to couple the left and right elastic members 30 and function as a flexible tensile force transmitting member. The wire 41 is provided commonly to the left and right elastic members 30, and the intermediate portion of the wire 41 is covered by an outer tube 42 in a freely slidable manner. Each of the leg link mechanisms 20 has a pulley 26 mounted thereon, and the left and right end portions of the wire 41 are coupled to the corresponding elastic members 30 by left and right coupling mechanisms 43, respectively.

The outer tube 42 is a tube having a prescribed length and is disposed to extend substantially in the lateral direction on the back side of the torso mount member 2. The left and right end portions of the outer tube 42 extend downward and are fixed to the front portions of the upper end portions 24*a* of the link main bodies 24 of the left and right thigh links 22, respectively.

The wire 41 is passed through the outer tube 42 freely slidably, and extend out from both ends of the outer tube 42. The left and right extending out portions of the wire 41 each pass on the front side of the pulley 26 on the corresponding side through the axis (interior) of the link main body 24 of the thigh link 22. Each extending out portion of the wire 41 passing on the front side of the pulley 26 extends through the through hole 30*a* of the elastic member 30 and is coupled to the lower end of the elastic member 30 via a coupling mechanism 43.

The wire 41 passes the front side of each pulley 26, and the swing axis 23X between the thigh link 22 and the lower leg link 23 is located at a position spaced from the wire 41 rearward. With this configuration, the route length of the wire 41 from each of the left and right end portions of the outer tube 42 to the upper end portion 23*a* of the lower leg link 23 on the corresponding side monotonously increases with an increase in the bending degree of the leg (the bending degree of the knee joint) when the user P bends the leg. Namely, the left and right pulleys 26 function as left and right cam members configured to change the route of the wire 41 such that the route length becomes longer as the total value of the swing angles of the left and right thigh links 22 relative to the left and right lower leg links 23 increases.

Therefore, when the user P wearing the bending and stretching motion assist device 1 bends the both legs with bending degrees substantially the same as each other from the state in which the both legs are stretched, the wire 41 moves upward in each of the left and right elastic members 30 along with the increase in the bending degrees of the both legs. Since the wire 41 is coupled to the lower end of each elastic member 30 via the coupling mechanism 43, when the user P bends the both legs, the left and right elastic members 30 undergo compression, so that the elastic force acts on the wire 41 as a tensile force. Namely, the elastic member 30, the wire 41, the coupling mechanism 43, and so on constitute the tensile force generating device 60 according to the present invention.

Next, the tensile force generating device 60 will be described. Since the left and right tensile force generating devices 60 have the same configuration, the right tensile force generating device 60 will be described here.

Figure 4:
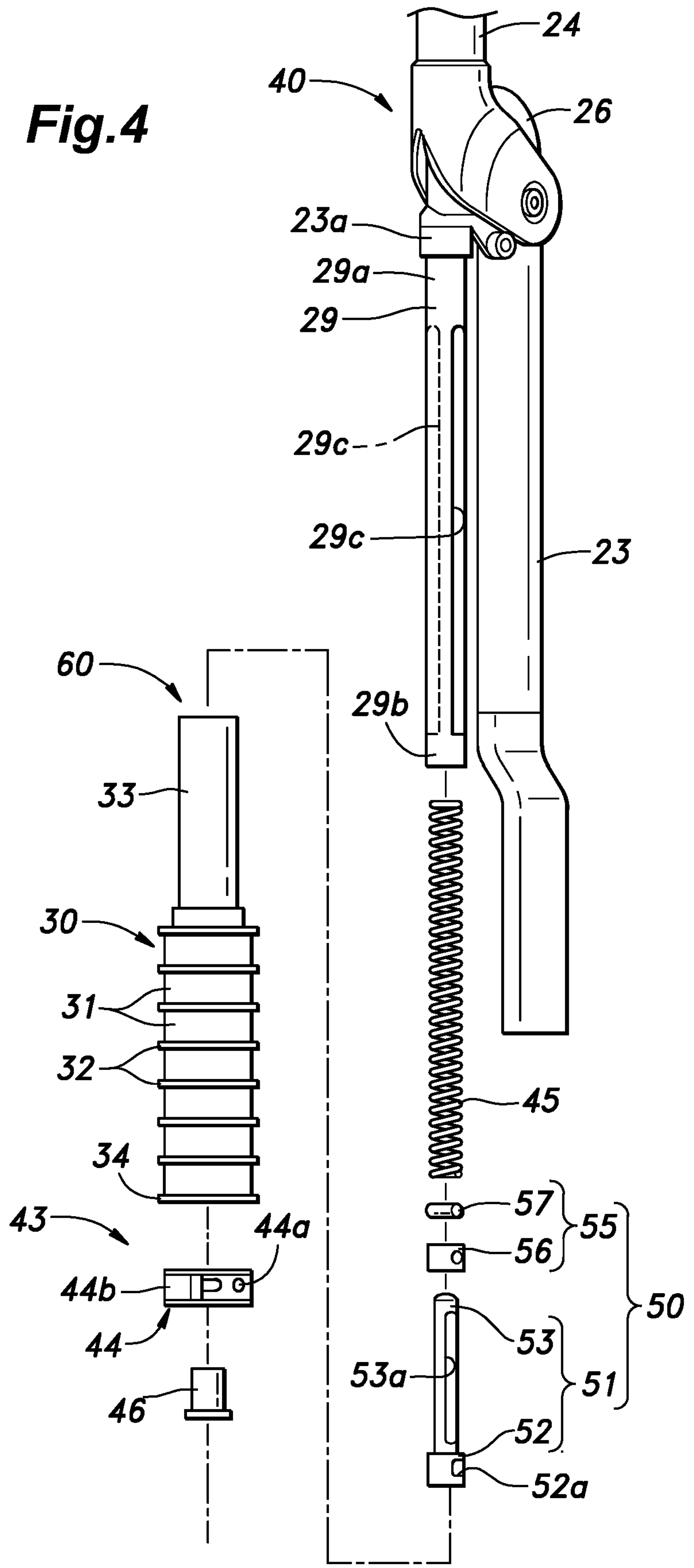
FIG. 4 is an exploded view of a tensile force generating device shown in FIG. 1.

FIG. 4 is an exploded view of the right tensile force generating device 60. As shown in FIGS. 1 to 4, a cylindrical guide pipe 29 having an outer diameter smaller than the through hole 30*a* of the elastic member 30 (FIG. 6) is fixed to the front portion of the upper end portion 23*a* of the lower leg link 23 which serves as a base member. The guide pipe 29 is disposed to extend along the longitudinal direction of the lower leg link 23 in front of the lower leg link 23, and has a base end 29*a* fixed to the lower leg link 23 and a free end 29*b*. The guide pipe 29 is formed with a pair of first slots 29*c*. These first slots 29*c* are located at mutually opposing circumferential positions and are formed along the longitudinal direction of the guide pipe 29.

Figure 6:
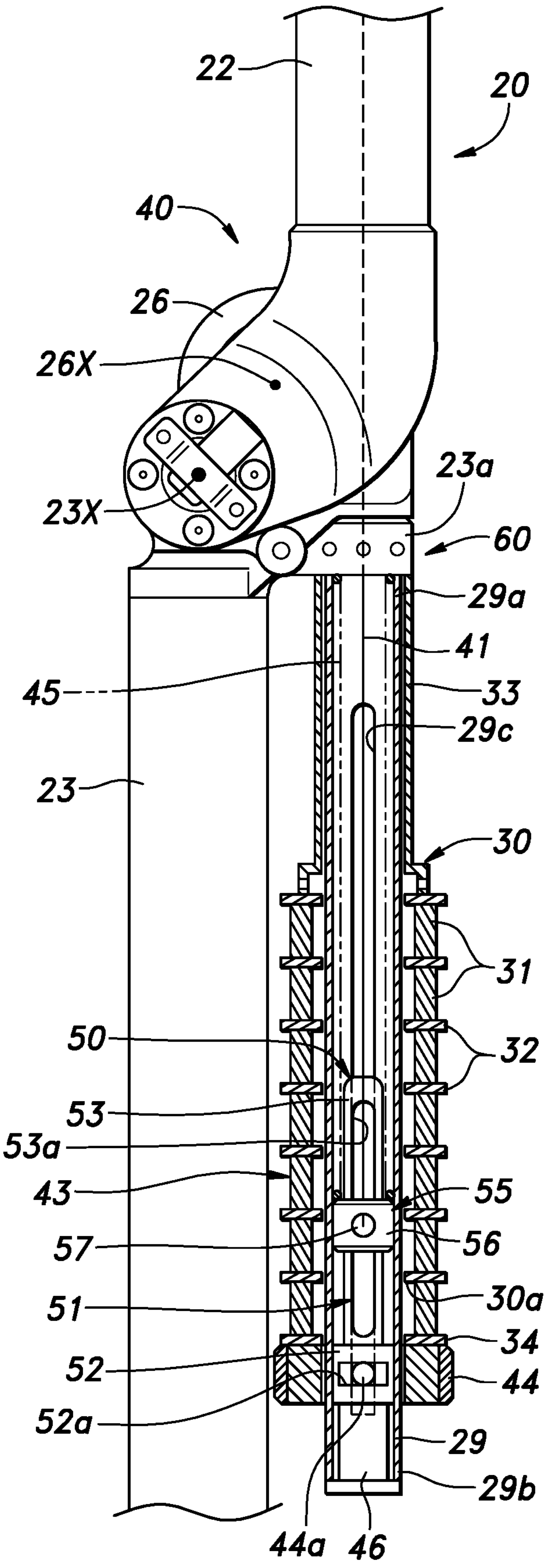
FIG. 6 is a sectional view of the tensile force generating device shown in FIG. 1.

FIG. 6 is a sectional view of the tensile force generating device 60. As shown in FIG. 6 also, the elastic member 30 has a multilayer structure formed by alternately stacking multiple elastic bodies 31 and multiple partition plates 32, and is provided with a pipe 33 for length adjustment at a base end portion thereof supported by the lower leg link 23. The mutually contacting elastic body 31 and partition plate 32 are bonded to each other by an adhesive or the like. At a part of the elastic member 30 to which the pipe 33 is joined and a tip end 34 of the elastic member 30 opposing from the pipe 33 the partition plates 32 are disposed. The through hole 30*a* extending in the stacking direction of the elastic bodies 31 and the partition plates 32 and in the extending direction of the pipe 33 passes the axial center of the elastic member 30 to penetrate through the elastic member 30. The elastic member 30 is only required to have an elasticity as a whole by including the elastic body 31 in a part thereof in the longitudinal direction.

Each elastic body 31 in the present embodiment is formed of a member having a number of sealed air chambers (not shown in the drawings) therein, such as, for example, a closed-cell (closed-pore) rubber sponge, such that it has a shape of an elliptical cylinder in a non-compressed state (natural state). The minimum width of the elastic body 31 (the minimum value of the external width of the elastic body 31 in the direction orthogonal to the direction of the axial center of the elastic body 31) is set to be smaller than the length of the elastic member 30 in the stacking direction.

Each partition plate 32 is formed of a member having stiffness sufficiently higher than that of the elastic bodies 31, for example, metal, hard resin or the like, and is formed in an elliptical ring shape in the present embodiment. The direction of the axial center (or the thickness direction) of each partition plate 32 is the stacking direction of the elastic member 30. The through hole of each partition plate 32 constitutes a part of the through hole 30*a* of the elastic member 30. The outer contour and the area of each partition plate 32 are set such that each partition plate 32 overlaps with the entirety of the elastic bodies 31 as viewed in the direction of the axial center thereof (thickness direction).

In this way, the elastic member 30 is constituted of an elastic structure having a multilayer structure including the multiple elastic bodies 31 and the multiple annular partition plates 32 stacked alternately in the axial direction, where the partition plates 32 have higher stiffness than the elastic bodies 31, whereby the elastic member 30 is less likely to undergo buckling or curving. Also, compared to a metallic spring member or the like configured to generate the same elastic force, the elastic member 30 is more lightweight. For further details and modifications of the elastic member 30, refer to Patent Document 2 filed by the present applicant.

The elastic member 30 is mounted on (fitted over) the outer circumferential portion of the guide pipe 29 to be capable of expanding and contracting in the direction of the axial center. The tip end 34 of the elastic member 30 is supported by an end member 44 slidably mounted on the guide pipe 29. The pipe 33 forming the base end portion of the elastic member 30 is in contact with and supported by the upper end portion 23*a* of the lower leg link 23. The wire 41 passing through the through hole 30*a* of the elastic member 30 is disposed inside the guide pipe 29 and is coupled to the lower end of the elastic member 30 via the coupling mechanism 43.

Figure 5:
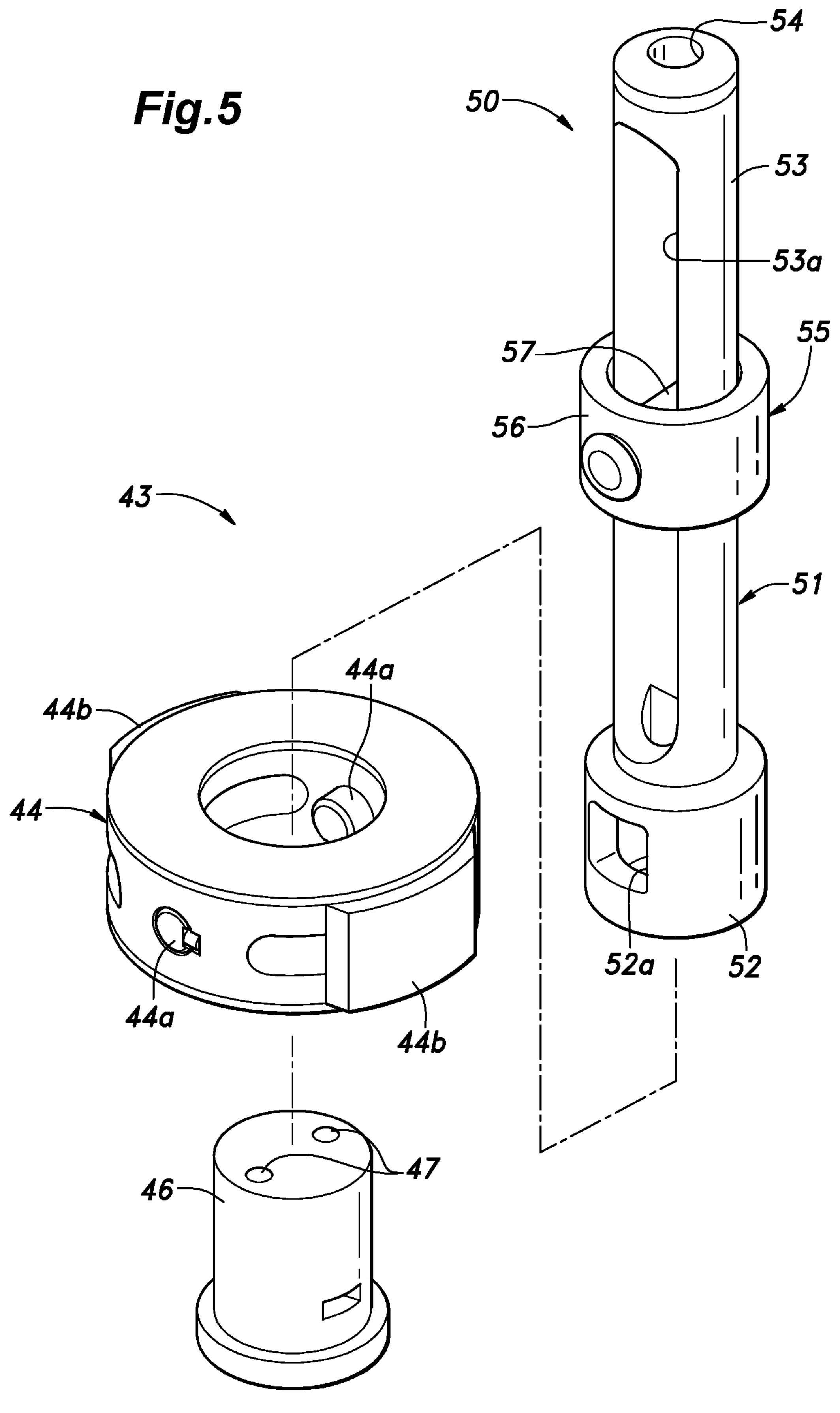
FIG. 5 is an exploded perspective view of a coupling mechanism shown in FIG. 4.

FIG. 5 is an exploded perspective view of the coupling mechanism 43 of the tensile force generating device 60. As shown in FIGS. 4 to 6, a compression coil spring 45 is inserted in the guide pipe 29, and a slider 50 is inserted in the same following the insertion of the compression coil spring 45. After the insertion of the slider 50, an end cap 46 is inserted in the free end 29*b* of the guide pipe 29, whereby the opening of the free end 29*b* is closed. The slider 50 is slidably provided inside the guide pipe 29, and the wire 41 is joined to the slider 50 inside the guide pipe 29. The end member 44 is joined to the slider 50 through the first slots 29*c* of the guide pipe 29.

The end member 44 is annular in shape and has a pair of pins 44*a* retractably protruding inward from the inner circumferential surface thereof. The pair of pins 44*a* is always urged in a direction to protrude from the inner circumferential surface by urging members not shown in the drawings. The outer circumferential surface of the end member 44 is provided with operation members 44*b* which, when gripped, cause the pair of pins 44*a* to move to a retracted position.

The slider 50 includes a shaft-shaped slider main body 51. The slider main body 51 has a free end portion 52 disposed on the side of the free end 29*b* of the guide pipe 29 and a guide portion 53 extending from the free end portion 52 toward the base end 29*a* of the guide pipe 29. The free end portion 52 is of a cylindrical shape having an outer diameter slightly smaller than the inner diameter of the guide pipe 29. The outer circumferential surface of the free end portion 52 is formed with mating holes 52*a* into which the pair of pins 44*a* are fitted to join the end member 44. In the present embodiment, the mating holes 52*a* penetrate the free end portion 52 in the radial direction. The guide portion 53 is of a cylindrical shape having an outer diameter smaller than the inner diameter of the compression coil spring 45. The guide portion 53 is formed with a second slot 53*a* that extends in the longitudinal direction. The second slot 53*a* penetrates the guide portion 53 in the radial direction and has closed terminal ends at both longitudinal ends. A base end-side end portion (upper end) of the slider main body 51 is formed with an insertion hole 54 (FIG. 5) which extends to the second slot 53*a* along the axis of the guide portion 53 to have the wire 41 inserted therethrough.

Also, the slider 50 has a movable ring member 55 slidably provided on the outer circumferential portion of the guide portion 53 of the slider main body 51. The movable ring member 55 includes a cylindrical tubular portion 56 which has an outer diameter slightly smaller than the inner diameter of the guide pipe 29 and is fitted on the outer circumferential portion of the guide portion 53. Inside the tubular portion 56 a wire retaining pin 57 is provided, where the wire retaining pin 57 has both ends supported by the tubular portion 56 and penetrates through the second slot 53*a* to retain the wire 41. The movable ring member 55 is slidable within a range defined by contacting of the wire retaining pin 57 with the terminal ends of the second slot 53*a*.

The wire 41 passed into the guide pipe 29 extends through the insertion hole 54 of the guide portion 53 into the second slot 53*a*, and is joined to the wire retaining pin 57. One end of the compression coil spring 45 is seated on the base end-side end surface of the movable ring member 55. The other end of the compression coil spring 45 is seated on the bottom surface of the upper end portion 23*a* of the lower leg link 23. Thus, the movable ring member 55 is constantly urged toward the free end portion 52 of the slider main body 51 by the compression coil spring 45.

The slider main body 51 and the movable ring member 55 are each made of a metal having high stiffness, and the slider main body 51 is made of a ferromagnetic material.

The compression coil spring 45 is designed to have a stiffness (so-called spring constant) sufficiently smaller than that of the elastic member 30. The stiffness of the compression coil spring 45 is selected to allow the user P to bend the knee joint without feeling discomfort when the user P walks or perform any other motion.

Due to the configuration in which the slider 50 includes the slider main body 51 having the guide portion 53 and the movable ring member 55 slidably provided on the guide portion 53, and the wire 41 is joined to the movable ring member 55, the tensile force generating device 60 is provided with play in which the elastic member 30 does not generate an elastic force. The compression coil spring 45 functions as a slack-eliminating elastic member for applying a weak tensile force (pre-tension) to the wire 41 to eliminate a slack in the wire 41.

As shown in FIG. 5, the insertion-side end surface of the end cap 46 is provided with a pair of magnets 47. These magnets 47 magnetically attract the free end portion 52 of the slider main body 51 to hold the slider main body 51. The magnetic force of the magnets 47 is set to a value sufficient to hold the slider 50, and does not obstruct the motion of the user P involving bending of the lower limb.

As shown in FIG. 6, the length of the elastic member 30 is set to achieve the following state by adjustment of the length (cutting position) of the pipe 33. Namely, in the standing state in which the user P stretches the knee joints, the slider main body 51 contacts the end cap 46 and is held in the end cap 46. Also, the end member 44 joined to the slider main body 51 supports the tip end 34 of the elastic member 30 such that the elastic member 30 does not rattle and is not compressed.

The length of the wire 41 is set such that in the standing state in which the user P stretches the knee joints, the movable ring member 55, which is urged by the compression coil spring 45 toward the free end, is positioned lower than the base end-side (upper) terminal end of the second slot 53*a* by a distance corresponding to prescribed play.

Figure 7:
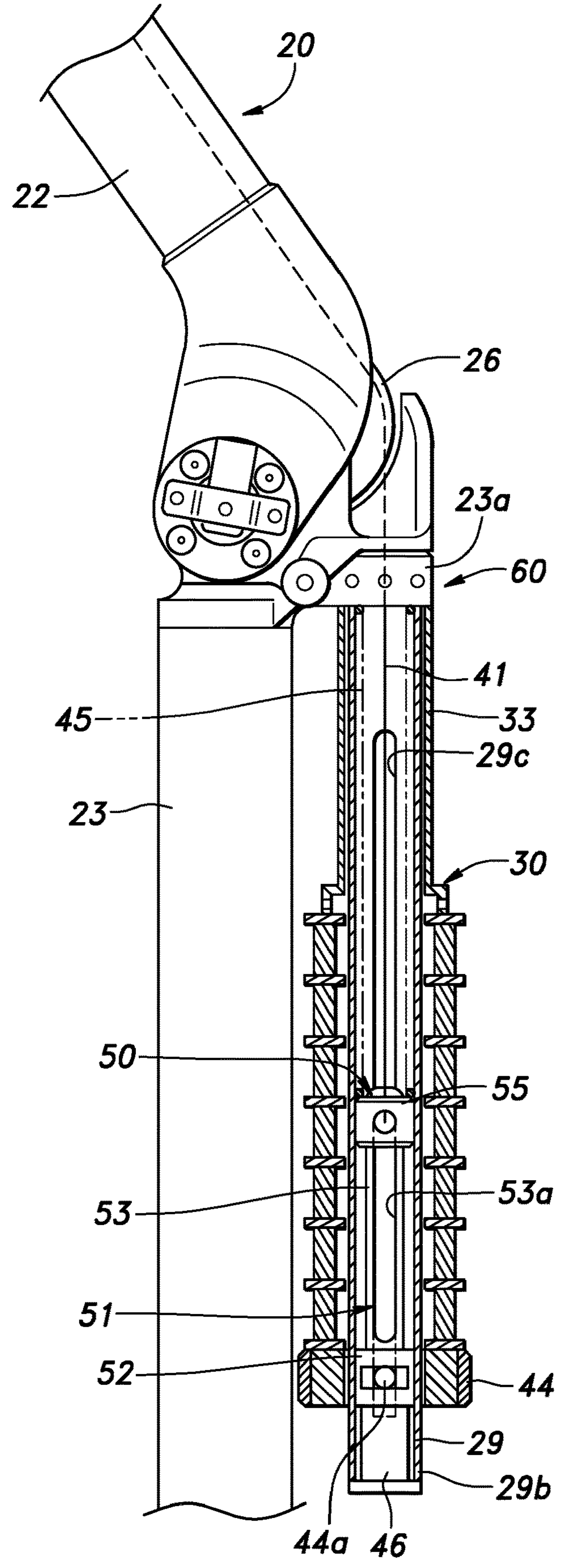
FIG. 7 is an operation explanatory diagram of the tensile force generating device shown in FIG. 4.
Figure 8:
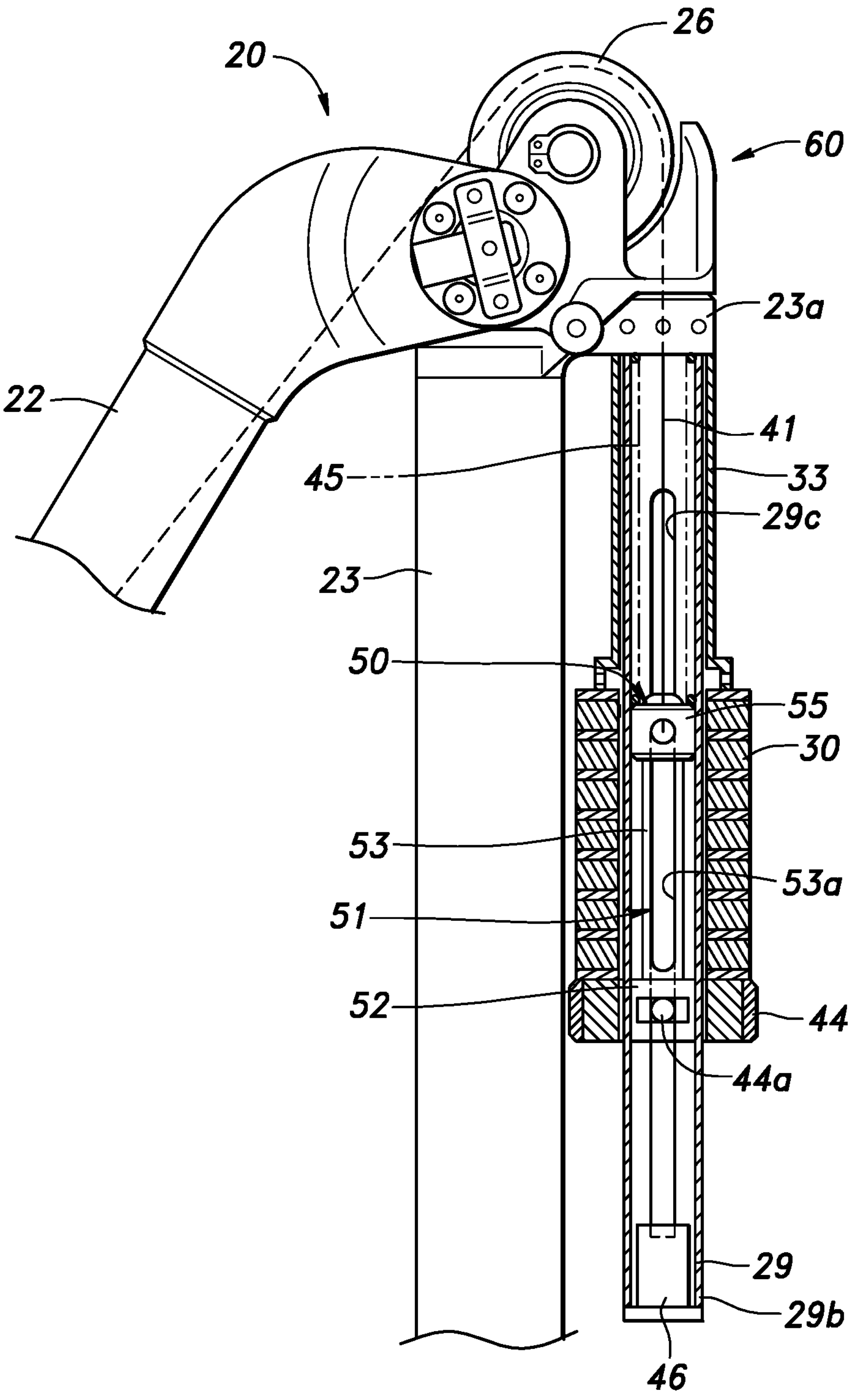
FIG. 8 is an operation explanatory diagram of the tensile force generating device shown in FIG. 4.

When the user P bends the knee joints from this state and the swing angles of the left and right thigh links 22 relative to the respective lower leg links 23 increase, the movable ring member 55 slides upward in the second slot 53*a*. Until the movable ring member 55 comes into contact with the base end-side terminal end of the second slot 53*a* as shown in FIG. 7, only the elastic force of the compression coil spring 45 acts on the wire 41. Once the movable ring member 55 comes into contact with the base end-side terminal end of the second slot 53*a*, the slider main body 51 slides toward the base end along the guide pipe 29. Thereby, as shown in FIG. 8, the end member 44 joined to the slider main body 51 slides together with the slider main body 51 toward the base end along the guide pipe 29 and compresses the elastic member 30, whereby an elastic force is generated. The elastic force generated by the elastic member 30 acts on the wire 41 as a tensile force.

Figure 9:
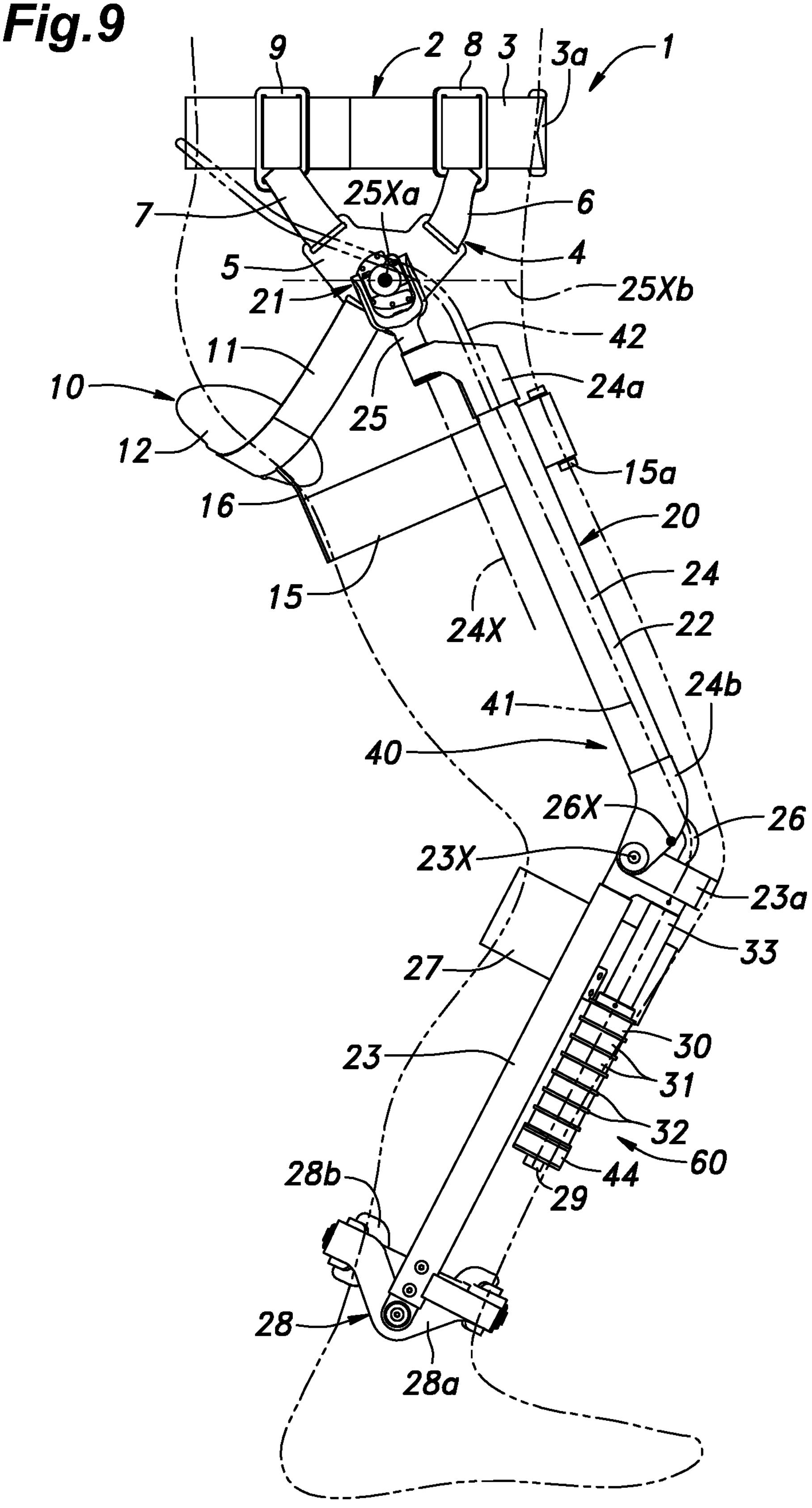
FIG. 9 is an operation explanatory diagram of the bending and stretching motion assist device shown in FIG. 1.

The tensile force generating device 60 and the bending and stretching motion assist device 1 are configured as described above. Therefore, when the user P wearing the bending and stretching motion assist device 1 bends the both legs with bending degrees substantially the same as each other from the state in which the both legs are stretched, the bending and stretching motion assist device 1 assumes a state as shown in FIGS. 7 and 9. Namely, with an increase in the bending degrees of the both legs, the left and right movable ring members 55 move upward in the corresponding guide pipes 29. Note that the motion involving bending of the both legs of the user P as this may be a motion performed when the user P sits on a chair or the like or squats in a Hindu squat motion or the like, for example.

As the bending degrees of the both legs of the user P increase, each movable ring member 55 approaches the base end-side terminal end of the second slot 53*a* while each compression coil spring 45 contracts. Under this circumstance, only the compression coil springs 45, which have sufficiently small stiffness compared to that of each elastic member 30, contract, and therefore, the tensile force of the wire 41 remains sufficiently small. Consequently, an assist force in the direction to stretch the both legs of the user P is substantially not generated.

Figure 10:
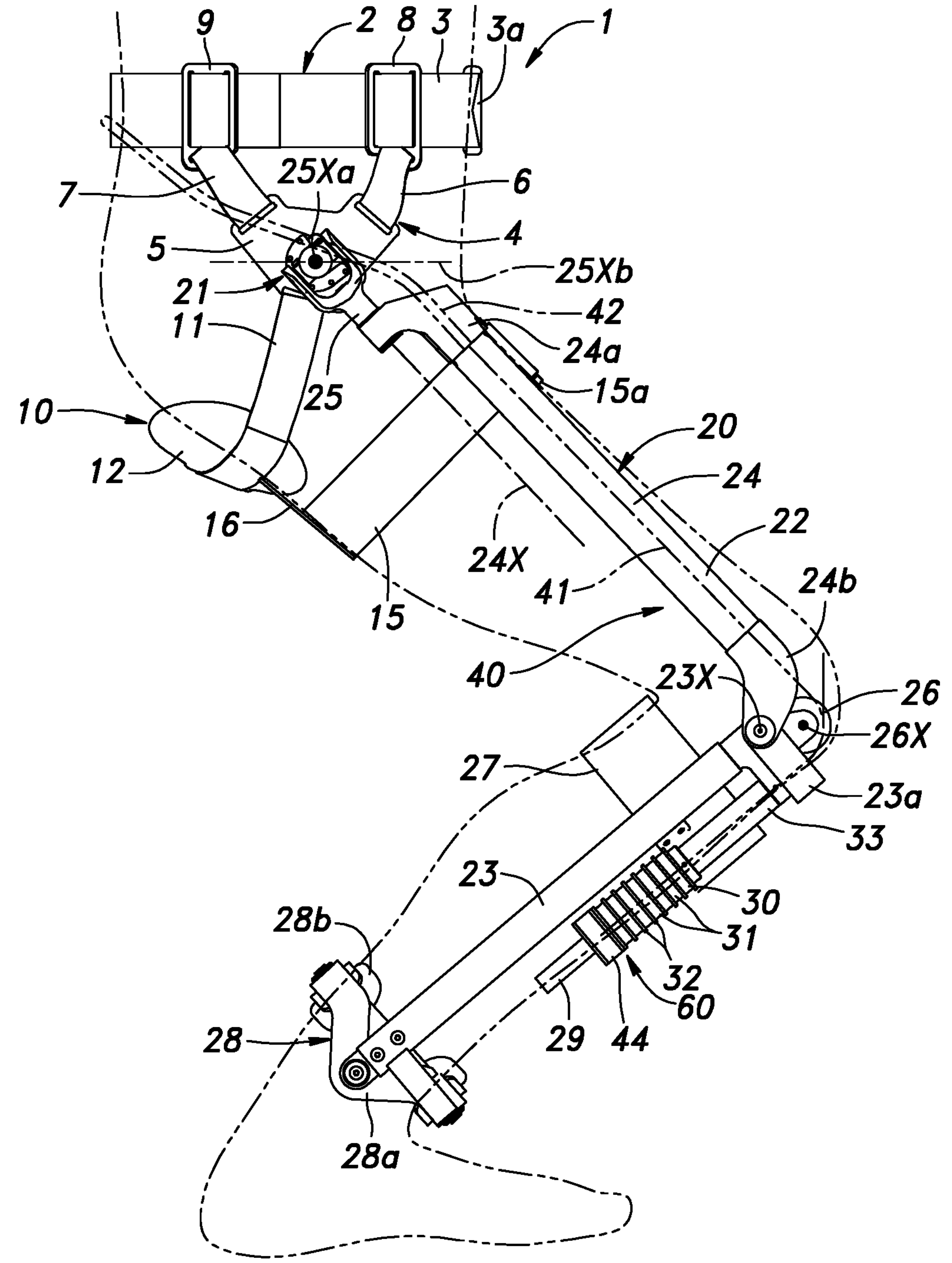
FIG. 10 is an operation explanatory diagram of the bending and stretching motion assist device shown in FIG. 1.

As the bending degrees of the both legs of the user P increase further, each of the movable ring members 55 comes into contact with the lower end of the corresponding elastic member 30 and is engaged by the same. As the bending degrees of the both legs of the user P increase further from this state, the bending and stretching motion assist device 1 assumes a state as shown in FIGS. 8 and 10. Namely, with an increase in the route length of the wire 41 from each of the left and right end portions of the outer tube 42 to the upper end of each of the left and right guide pipes 29, the end member 44 joined to each slider 50 causes the associated elastic member 30 to undergo compressive deformation. Thereby, each elastic member 30 generates an elastic force in the stretching direction, and this elastic force acts on each leg link mechanism 20 via the motion transmission mechanism 40 as an assist torque in the stretching direction.

This assist torque acting on each leg link mechanism 20 in the stretching direction acts on the left and right ankles and the torso of the user P as an assist force that separates each of the left and right ankles from the torso of the user P (assists the stretching motion at the knee joint of each leg) via the lower leg mount member 28 and each of the link support members 4 of the torso mount member 2. In this way, each of the left and right elastic members 30 and the motion transmission mechanism 40 constitute the tensile force generating device 60 for generating an assist force in the stretching direction between the lower leg link 23 and the thigh link 22 to assist the bending and stretching motion of the lower limb of the user P.

As shown in FIG. 10, in this bent state of the lower limbs of the user P, the buttocks pad 12 is positioned lower than the upper end of each thigh link 22. Therefore, the upward force transmitted from each link support member 4 of the torso mount member 2 to the torso of the user P is transmitted from the link support member 4 to the buttocks support member 10 and then from the buttocks pad 12 positioned below the buttocks to the buttocks of the user P. Namely, the assist force is not transmitted from the torso belt 3 to the waist of the user P to lift up the waist, but is transmitted to the buttocks of the user P to push up the buttocks upward. Thereby, the bending and stretching motion of the user P is favorably assisted. Also, the movable range of the upper body of the user P is not limited.

This assist force supports the upper body load when the user P bends the left and right legs to squat and when the user P stretches the left and right legs to stand up. Namely, this assist force acts as an assist force assisting the bending and stretching motion of the user P. The elastic force of the elastic members 30 and the tensile force of the wire 41 creating this assist force increase with a further increase in the bending degrees of the both legs of the user P.

As described above, when the both legs of the user P are bent, the elastic force of each elastic member 30 is substantially not generated until the bending degrees of the both legs reach a prescribed bending degree (the bending degree shown in FIGS. 7 and 9 at which both of the movable ring members 55 come into contact with the terminal ends of the second slots 53*a*). Therefore, the assist force substantially does not act on the both legs of the user P. Then, when the bending degrees of the both legs of the user P exceed the aforementioned prescribed bending degree, the elastic force of the elastic member 30 is generated and the tensile force of the wire 41 increases, whereby an assist force in the stretching direction acts on the both legs of the user P.

On the other hand, when the user P wearing the bending and stretching motion assist device 1 bends one leg while maintaining the other leg in the stretched state (or a state close to this state), the wire 41 moves in the outer tube 42. As a result, only the elastic force of the left and right compression coil springs 45 acts on the wire 41 until both of the left and right movable ring members 55 come into contact with the base end-side terminal ends of the corresponding second slots 53*a*.

Therefore, unless the bending angle of the one leg exceeds this angle, the elastic force of the elastic member 30 is substantially not generated and the assist force substantially does not act on the leg of the user P. This angle is greater than the angle at which the assist force starts acting when the user P bends the both legs, and is about twice the angle. Therefore, the user P can perform a motion, such as walking, that involves bending of one leg, with a similar feeling as in usual motion without feeling discomfort due to the assist force.

In this way, when the user P bends the both legs to a relatively large bending degree, such as when sitting on a chair or the like, the bending and stretching motion assist device 1 generates an assist force in the direction to stretch the both legs once the bending degrees of the both legs become greater than or equal to a certain degree. On the other hand, when the bending degrees of the both legs are small, the aforementioned assist force is substantially not generated. This function is realized without requiring an actuator such as an electric motor.

In addition, the bending and stretching motion assist device 1 is configured such that the motion transmission by the motion transmission mechanism 40 is carried out by using the wire 41 which is a flexible tensile force transmitting member, and therefore, the bending and stretching motion assist device 1 is lightweight and simple in structure. Specifically, the motion transmission mechanism 40 realizes a simple and lightweight configuration by including the wire 41, the left and right pulleys 26 functioning as cam members for changing the route length of the wire 41, and the elastic members 30 configured to expand and contract in response to the change in the route length of the wire 41. Thereby, the user P can perform walking motion or the like while wearing the bending and stretching motion assist device 1, in the same manner as usual without feeling discomfort or burden.

On the other hand, as shown in FIGS. 5 and 6, the tensile force generating device 60 of the present embodiment has a configuration in which the elastic member 30 is fitted over the guide pipe 29, and the end member 44 slidably mounted on the guide pipe 29 supports the tip end 34 of the elastic member 30. Further, the slider 50 slidably received in the guide pipe 29 is joined to the tip of the wire 41 passed into the guide pipe 29, and is joined to the end member 44 through the first slots 29*c* of the guide pipe 29. Thus, since the elastic member 30 is fitted over the guide pipe 29, the elastic member 30 is less likely to contact the guide pipe 29 when the elastic member 30 is compressed and bulges outward. Therefore, it is unnecessary to secure a large clearance between the elastic member 30 and the guide pipe 29, and the tensile force generating device 60 can be made compact. Further, even if the elastic member 30 is curved when compressed, the elastic member 30 comes into contact with the outer surface of the guide pipe 29 with a small degree of curvature, and therefore, smooth expansion and contraction of the elastic member 30 is less likely to be hindered by the generated friction. Therefore, an elastic force in accordance with the amount of compression of the elastic member 30 is applied to the wire 41.

Also, the slider 50 of the present embodiment includes: the slider main body 51 having the free end portion 52, to which the end member 44 is joined, and the guide portion 53 formed with the second slot 53*a*; and the movable ring member 55 fitted over the guide portion 53. The wire 41 is passed through the insertion hole 54 formed in the slider main body 51 to reach the second slot 53*a*, and is joined to the movable ring member 55 in the second slot 53*a*. Thereby, the movable ring member 55 to which the wire 41 is joined can slide along the guide portion 53 without causing the end member 44 to slide, and this can provide the tensile force generating device 60 with play in which the elastic force does not act on the wire 41. In addition, since the wire 41 is joined to the movable ring member 55 inside the second slot 53*a*, it is possible to prevent the slider 50 from tilting due to uneven force and getting caught by the inner surface of the guide pipe 29.

In the guide pipe 29, the compression coil spring 45 that constantly urges the movable ring member 55 toward the free end 29*b* of the guide pipe 29 is provided, and therefore, a slack in the wire 41 is eliminated. Thereby, the wire 41 is prevented from falling off the pulley 26. Further, the compression coil spring 45 is provided inside the guide pipe 29 and outside the guide portion 53 in a compressed state between the lower leg link 23 and the movable ring member 55. Thereby, the urging member can be disposed in an empty space inside the guide pipe 29 without obstructing the sliding of the movable ring member 55 and the sliding of the slider 50 and with a simple configuration.

Incidentally, in the bending and stretching motion assist device 1 as described above, the assist force is sometimes adjusted in accordance with the physique of the user P and/or the physical condition of the user P. In this case, to change the assist force, the elastic member 30 needs to be replaced with one having a different elastic modulus. Also, the elastic member 30 may be replaced due to deterioration of the elastic body 31 or the elastic member 30 may be removed from the motion assist device for inspection.

In the conventional structure as disclosed in Patent Document 2, to replace the elastic structure, it is necessary to separate the wire 41 from the elastic structure in order to remove the elastic structure. In addition, after mounting the elastic structure, it is necessary to connect the wire 41 to the elastic structure. Therefore, the replacement work of the elastic structure was cumbersome. Particularly, the work of passing the wire 41 through the through holes formed in the partition plates 32 in order to insert the wire 41 into the elastic structure was cumbersome.

In contrast, in the tensile force generating device 60 of the present embodiment, the end member 44 for supporting the tip end 34 of the elastic member 30 is detachably joined to the slider 50. Therefore, by releasing the joining of the end member 44 and removing the end member 44 from the guide pipe 29, the elastic member 30 fitted over the guide pipe 29 can be removed without releasing the joining of the wire 41 to the slider 50. Further, without requiring the work of joining the wire 41 to the slider 50, it is possible to fit the elastic member 30 over the guide pipe 29 and to make the end member 44 support the tip end 34 of the elastic member 30. Therefore, the replacement work of the elastic member 30 easy.

Furthermore, since the free end 29*b* of the guide pipe 29 is provided with the end cap 46 to restrict sliding of the slider 50 toward the free end 29*b*, positioning of the slider 50 can be achieved by the end cap 46 when the end member 44 is joined to the slider 50. Also, the end cap 46 suppresses intrusion of foreign matters into the guide pipe 29 via the free end 29*b* of the guide pipe 29, and therefore, smooth sliding of the slider 50 is maintained.

In addition, since the magnets 47 for maintaining the state in which the slider 50 is in contact with the end cap 46 are provided on the end cap 46, when the joining of the end member 44 to the slider 50 is released, the slider 50 does not freely move in the guide pipe 29. Therefore, the work of joining the end member 44 to the slider 50 at such time as when replacing the elastic member 30 is easy. Note that the magnets 47 may be provided on the slider 50 and the end cap 46 may be made of a ferromagnetic material.

Second Embodiment

Figure 12:
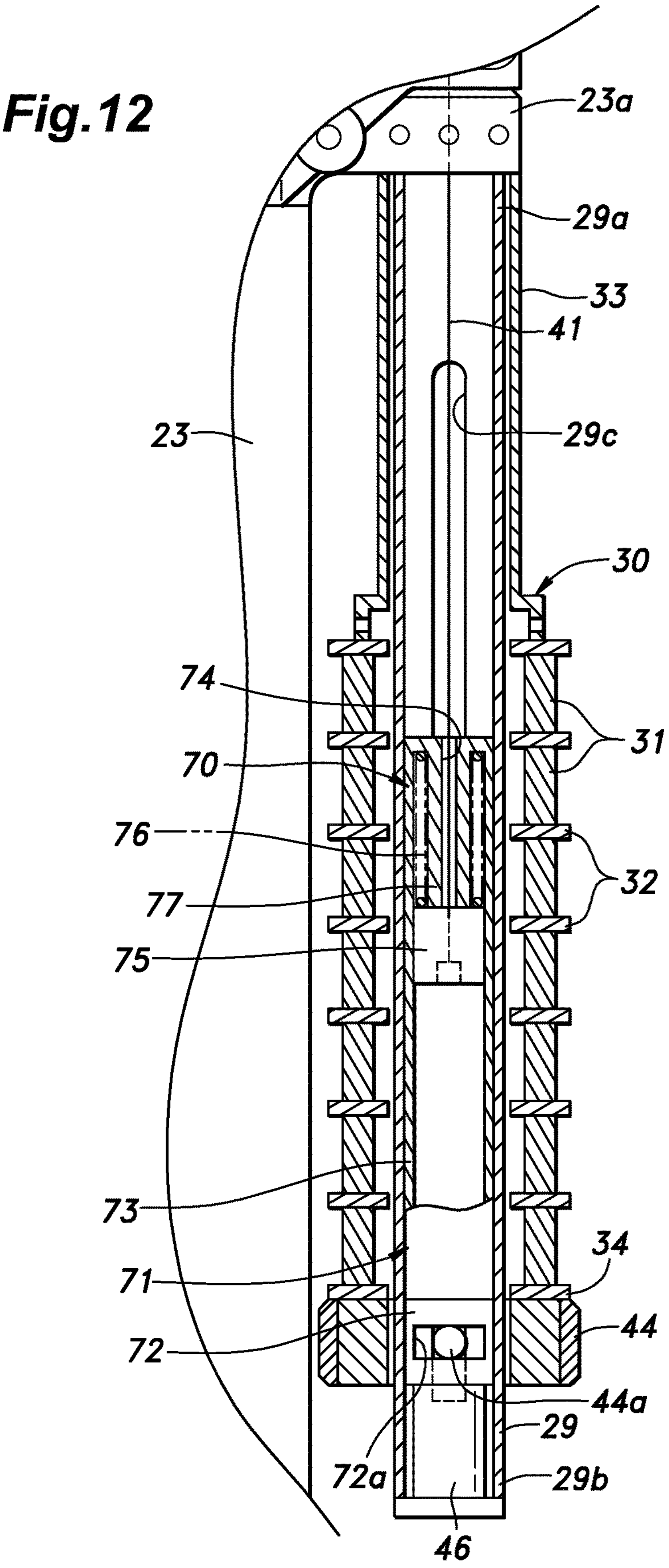
FIG. 12 is an operation explanatory diagram of the tensile force generating device shown in FIG. 11.
Figure 13:
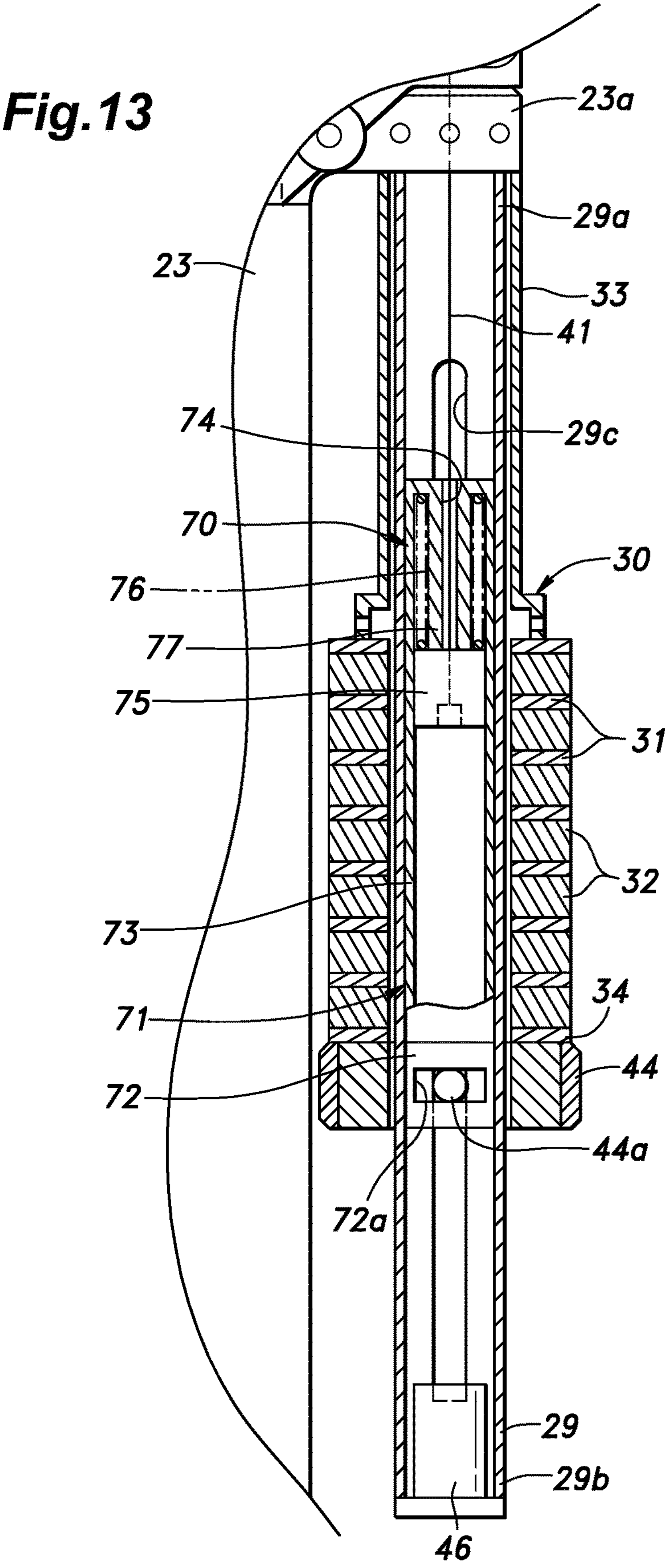
FIG. 13 is an operation explanatory diagram of the tensile force generating device shown in FIG. 11.

Next, with reference to FIGS. 11 to 13, the second embodiment of the present invention will be described. Note that the elements same as those in the first embodiment will be denoted by the same reference signs and redundant description will be omitted.

In the bending and stretching motion assist device 1 of this embodiment, the slider 70 of the tensile force generating device 60 differs from that of the first embodiment. In the following, concrete description will be provided. As shown in FIG. 11, the slider 70 includes a shaft-shaped slider main body 71. The slider main body 71 has a free end portion 72 disposed on the side of the free end 29*b* of the guide pipe 29 and a cylinder 73 extending from the free end portion 72 toward the base end 29*a* of the guide pipe 29. The free end portion 72 is of a cylindrical shape having an outer diameter slightly smaller than the inner diameter of the guide pipe 29. The outer circumferential surface of the free end portion 72 is formed with mating holes 72*a* into which the pair of pins 44*a* are fitted to join the end member 44. The cylinder 73 is of a bottomed tubular shape with a circular cross section having an outer diameter slightly smaller than the inner diameter of the guide pipe 29. The bottom wall of the cylinder 73 constituting the base end-side end portion (the upper end) of the slider main body 71 is formed with an insertion hole 74 which extends to the internal space along the axis of the cylinder 73 and through which the wire 41 is inserted.

Also, the slider 70 has a movable member 75 slidably provided in the internal space of the cylinder 73 of the slider main body 71. The movable member 75 is a cylindrical piston having an outer diameter slightly smaller than the inner diameter of the cylinder 73. The movable member 75 partitions the internal space of the cylinder 73 into a base end-side space and a free end-side space. The movable member 75 may preferably be provided with a communication hole for bringing the base end-side space and the free end-side space into communication with each other. The bottom wall of the cylinder 73 is integrally provided with a columnar stopper 77 protruding toward the free end portion 72 and limiting the sliding of the movable member 75. The insertion hole 74 is formed to penetrate the stopper 77.

The wire 41 passed into the internal space of the cylinder 73 through the insertion hole 74 of the slider main body 71 is joined to the movable member 75. One end of the compression coil spring 76 is seated on the base end-side end surface of the movable member 75. The compression coil spring 76 is provided between the circumferential wall of the cylinder 73 and the stopper 77 so as to be capable of expanding and contracting, and the other end of the compression coil spring 76 is seated on the bottom wall of the cylinder 73. Thus, the movable member 75 is constantly urged toward the free end portion 72 of the slider main body 71 by the compression coil spring 76, and is slidable between the stopper 77 and the free end portion 72.

Figure 11:
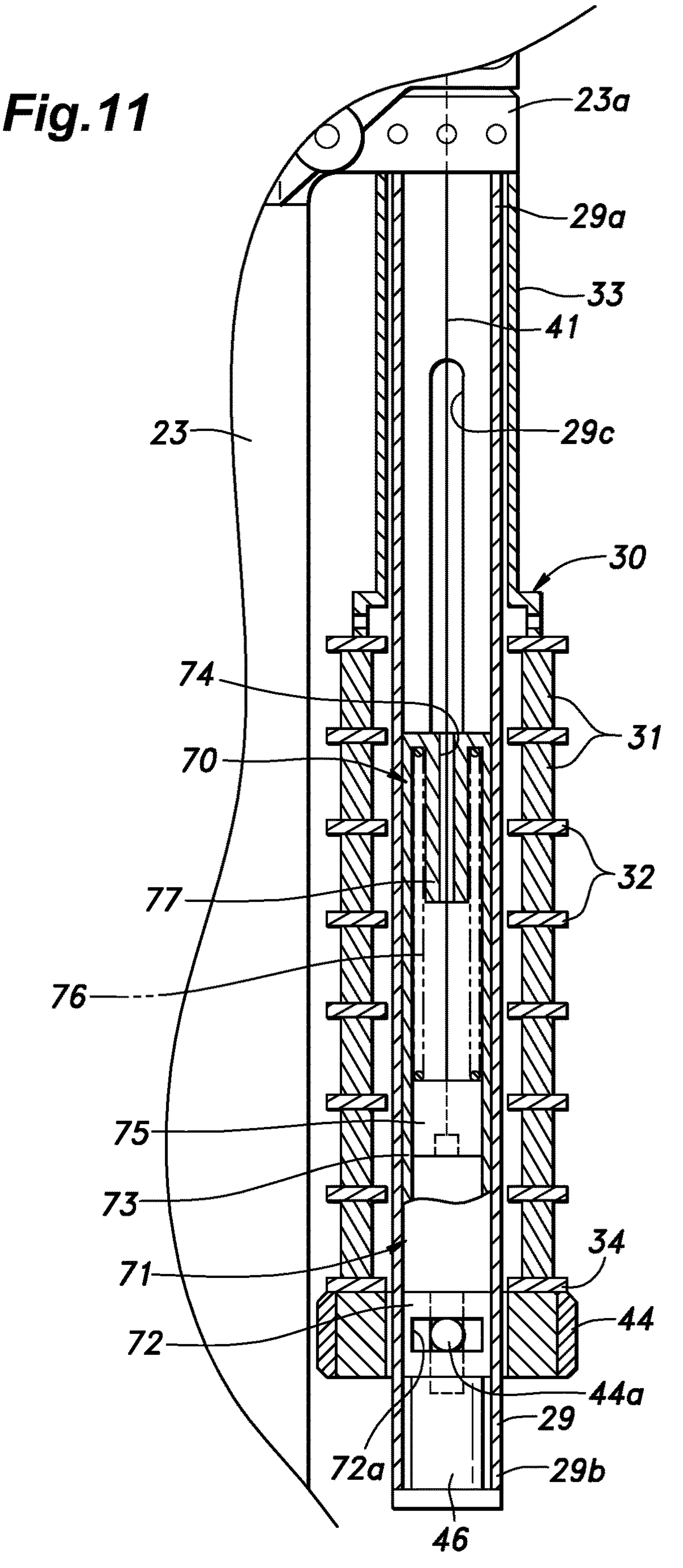
FIG. 11 is a sectional view of the tensile force generating device according to the second embodiment.

The length of the wire 41 is set such that, as shown in FIG. 11, in the standing state in which the user P stretches the knee joints, the movable member 75, which is urged by the compression coil spring 76 toward the free end, is positioned lower than the contact surface of the stopper 77 by a distance corresponding to prescribed play.

When the user P bends the knee joints from this state and the swing angles of the left and right thigh links 22 relative to the respective lower leg links 23 increase, the movable member 75 slides upward in the internal space of the cylinder 73. Until the movable member 75 comes into contact with the stopper 77 of the cylinder 73 as shown in FIG. 12, only the elastic force of the compression coil spring 76 acts on the wire 41. Once the movable member 75 comes into contact with the stopper 77, the slider main body 71 slides toward the base end along the guide pipe 29. Thereby, as shown in FIG. 12, the end member 44 joined to the slider main body 71 slides together with the slider main body 71 toward the base end along the guide pipe 29 and compresses the elastic member 30, whereby an elastic force is generated. The elastic force generated by the elastic member 30 acts on the wire 41 as a tensile force.

The slider 70 is configured as described above, and the configuration of this slider 70 also provides effects similar to those of the first embodiment.

As described above, the slider 70 of the present embodiment includes: the slider main body 71 having the free end portion 72, to which the end member 44 is joined, and the cylinder 73; and the movable member 75 fitted in the cylinder 73. The wire 41 is passed through the insertion hole 74 formed in the slider main body 71 to reach the internal space of the cylinder 73, and is joined to the movable member 75 in the internal space of the cylinder 73. Thereby, the movable member 75 to which the wire 41 is joined can slide along the cylinder 73 without causing the end member 44 to slide, and this can provide the tensile force generating device 60 with play in which the elastic force does not act on the wire 41. In addition, since the wire 41 is joined to the movable member 75 inside the internal space of the cylinder 73, it is possible to prevent the slider 70 from tilting due to uneven force and getting caught by the inner surface of the guide pipe 29.

In the internal space of the cylinder 73, the compression coil spring 76 that constantly urges the movable member 75 toward the free end 29*b* of the guide pipe 29 is provided, and therefore, a slack in the wire 41 is eliminated. Thereby, the wire 41 is prevented from falling off the pulley 26. Further, the compression coil spring 76 is disposed in a compressed state between the bottom wall of the cylinder 73 and the movable member 75, and the bottom wall of the cylinder 73 is provided with the stopper 77 with which the movable member 75 comes into contact when the compression coil spring 76 is compressed. Thereby, the urging member can be disposed in an empty space inside the guide pipe 29 without obstructing the sliding of the movable member 75 and the sliding of the slider 70 and with a simple configuration.

Concrete embodiments have been described in the foregoing, but the present invention is not limited to the above embodiments and may be modified or altered in various ways. For example, the concrete structure, arrangement, number, material, etc. of the members and parts may be appropriately changed within the spirit of the present invention. On the other hand, not all of the components shown in the above-described embodiments are necessarily indispensable and they may be selectively adopted as appropriate.

Glossary

1 bending and stretching motion assist device
2 torso mount member
20 leg link mechanism
22 thigh link
23 lower leg link (base member)
25 upper coupling member (upper end of lower leg link 23)
28 lower leg mount member
29 guide pipe
29*a* base end

29*b* free end
29*c* first slot
30 elastic member
30*a* through hole
31 elastic body
32 partition plate
33 pipe (base end)
34 tip end
40 motion transmission mechanism
41 wire (tensile force transmitting member)
43 coupling mechanism
44 end member
45 compression coil spring (urging member)
46 end cap
47 magnet
50 slider
51 slider main body
52 free end portion
53 guide portion
53*a* second slot
54 insertion hole
55 movable ring member
60 tensile force generating device
70 slider
71 slider main body
72 free end portion
73 cylinder
74 insertion hole
75 movable member
76 compression coil spring (urging member)
77 stopper
P user

The invention claimed is:

1. A tensile force generating device, comprising:
- a base member;
- a guide pipe having a base end fixed to the base member and a free end, the guide pipe being provided with a first slot extending in a longitudinal direction;
- a tubular elastic member fitted over the guide pipe and having a base end supported by the base member on a side of the base end of the guide pipe;
- a flexible tensile force transmitting member passed into the guide pipe from a side of the base end of the guide pipe;
- an end member slidably mounted on the guide pipe and supporting a tip end of the elastic member; and
- a slider slidably received in the guide pipe, joined to a tip of the tensile force transmitting member, and joined to the end member through the first slot.

2. The tensile force generating device according to claim 1, wherein the slider includes: a slider main body having a free end portion to which the end member is joined and a guide portion that extends in the guide pipe from the free end portion toward the base end of the guide pipe along an axial direction and has a second slot extending in the longitudinal direction; and a movable ring member slidably fitted over the guide portion, and
- a base end-side end portion of the slider main body is formed with an insertion hole extending to the second slot, and the tensile force transmitting member is passed through the insertion hole and is joined to the movable ring member inside the second slot.

3. The tensile force generating device according to claim 2, further comprising an urging member provided in the guide pipe to constantly urge the movable ring member toward the free end of the guide pipe.

4. The tensile force generating device according to claim 3, wherein the urging member is a compression coil spring provided inside the guide pipe and outside the guide portion in a compressed state between the base member and the movable ring member.

5. The tensile force generating device according to claim 1, wherein the slider includes: a slider main body having a free end portion to which the end member is joined and a bottomed tubular cylinder that extends in the guide pipe from the free end portion toward the base end of the guide pipe along an axial direction; and a movable member slidably fitted in the cylinder, and
- a base end-side end portion of the slider main body is formed with an insertion hole extending to an internal space of the cylinder, and the tensile force transmitting member is passed through the insertion hole and is joined to the movable member inside the internal space of the cylinder.

6. The tensile force generating device according to claim 5, further comprising an urging member provided in the internal space of the cylinder to constantly urge the movable member toward the free end of the guide pipe.

7. The tensile force generating device according to claim 6, wherein the urging member is a compression coil spring provided in the internal space of the cylinder and disposed in a compressed state between a bottom wall of the cylinder and the movable member, and
- the bottom wall of the cylinder is provided with a stopper configured to contact against the movable member when the compression coil spring is compressed.

8. The tensile force generating device according to claim 1, wherein the elastic member consists of an elastic structure having a multilayer structure which includes multiple elastic bodies and multiple annular partition plates stacked alternately in an axial direction, the partition plates having higher stiffness than the elastic bodies.

9. The tensile force generating device according to claim 1, wherein the end member is detachably joined to the slider.

10. The tensile force generating device according to claim 9, further comprising an end cap provided on the free end of the guide pipe to restrict sliding of the slider toward the free end.

11. The tensile force generating device according to claim 10, further comprising a magnet provided on at least one of the slider and the end cap to maintain a state in which the slider is in contact with the end cap.

12. A bending and stretching motion assist device, comprising:
- left and right thigh links configured to be respectively disposed along left and right thighs of a user;
- left and right tensile force generating devices each consisting of the tensile force generating device according to claim 1 and having a lower leg link configured to be disposed along corresponding lower leg of the user and swingably coupled to lower ends of the corresponding thigh links as the base member;
- a torso mount member having an annular shape to be able to be fitted on a torso of the user to support upper ends of the left and right thigh links swingably on respective sides of left and right hip joints of the user; and
- left and right lower leg mount members respectively attached to lower ends of the left and right lower leg links so as to be able to be fitted on the corresponding lower legs of the user;
- wherein left and right tensile force generating devices respectively provided on the left and right lower leg links to assist bending and stretching motion of lower limbs of the user and each configured to generate an assist force in a stretching direction to stretch the corresponding lower limb of the user in accordance with a bending angle between the lower leg link and the corresponding thigh link, and wherein the tensile force transmitting members are provided commonly as a single tensile force transmitting member for the left and right tensile force generating devices, and left and right tips of the tensile force transmitting members are joined to the sliders of the left and right tensile force generating devices, respectively.

* * * * *